United States Patent
Condon et al.

(10) Patent No.: US 7,055,995 B1
(45) Date of Patent: Jun. 6, 2006

(54) APPARATUS AND METHOD OF GUIDING AND SHAPING LIGHT FROM LIGHT SOURCE

(75) Inventors: Patrick J. Condon, Ames, IA (US); Mark B. Pruss, Story City, IA (US)

(73) Assignee: Innovative Lighting, Inc., Roland, IA (US)

( * ) Notice: Subject to any disclaimer, the term of this patent is extended or adjusted under 35 U.S.C. 154(b) by 166 days.

(21) Appl. No.: 10/357,796

(22) Filed: Feb. 4, 2003

Related U.S. Application Data

(60) Provisional application No. 60/335,011, filed on Feb. 5, 2002.

(51) Int. Cl.
- *F21V 1/00* (2006.01)
- *F21V 9/00* (2006.01)
- *F21V 7/04* (2006.01)
- *G02B 27/30* (2006.01)

(52) U.S. Cl. ............ 362/477; 362/511; 362/551; 362/555; 359/641

(58) Field of Classification Search .......... 359/641; 362/511, 555, 583, 27, 477, 551
See application file for complete search history.

(56) References Cited

U.S. PATENT DOCUMENTS

| | | |
|---|---|---|
| 5,905,595 A | 5/1999 | Minami |
| 6,111,705 A | 8/2000 | Rohlfing |
| 6,270,244 B1 * | 8/2001 | Naum ............ 362/583 |

\* cited by examiner

*Primary Examiner*—Georgia Epps
*Assistant Examiner*—Jack Dinh
(74) *Attorney, Agent, or Firm*—McKee, Voorhees & Sease, P.L.C.

(57) ABSTRACT

An apparatus and method for controlling light from a non-rectangular light source. The apparatus and method relate to using a light guide of a single piece of light-transmissive material having a plurality of external surfaces. One external surface is shaped to collect and substantially collimate light from the light source into the interior of the light guide. At least one external surface is shaped to internally control and direct light such that it issues from the light guide in a substantially rectangular pattern and with substantially total internal reflection. The light guide can be used to create a single controlled beam pattern. In another aspect, one light guide could be adapted to issue two controlled beam patterns. Still further, two light guides could be mounted in a common housing and used to generate two beam patterns. One exemplary application of two beam patterns is a bow light for marine vessels. One pattern would issue a red pattern; the other a blue-green pattern; each angularly offset from the other in a horizontal plane, such as dictated by marine regulations.

66 Claims, 16 Drawing Sheets

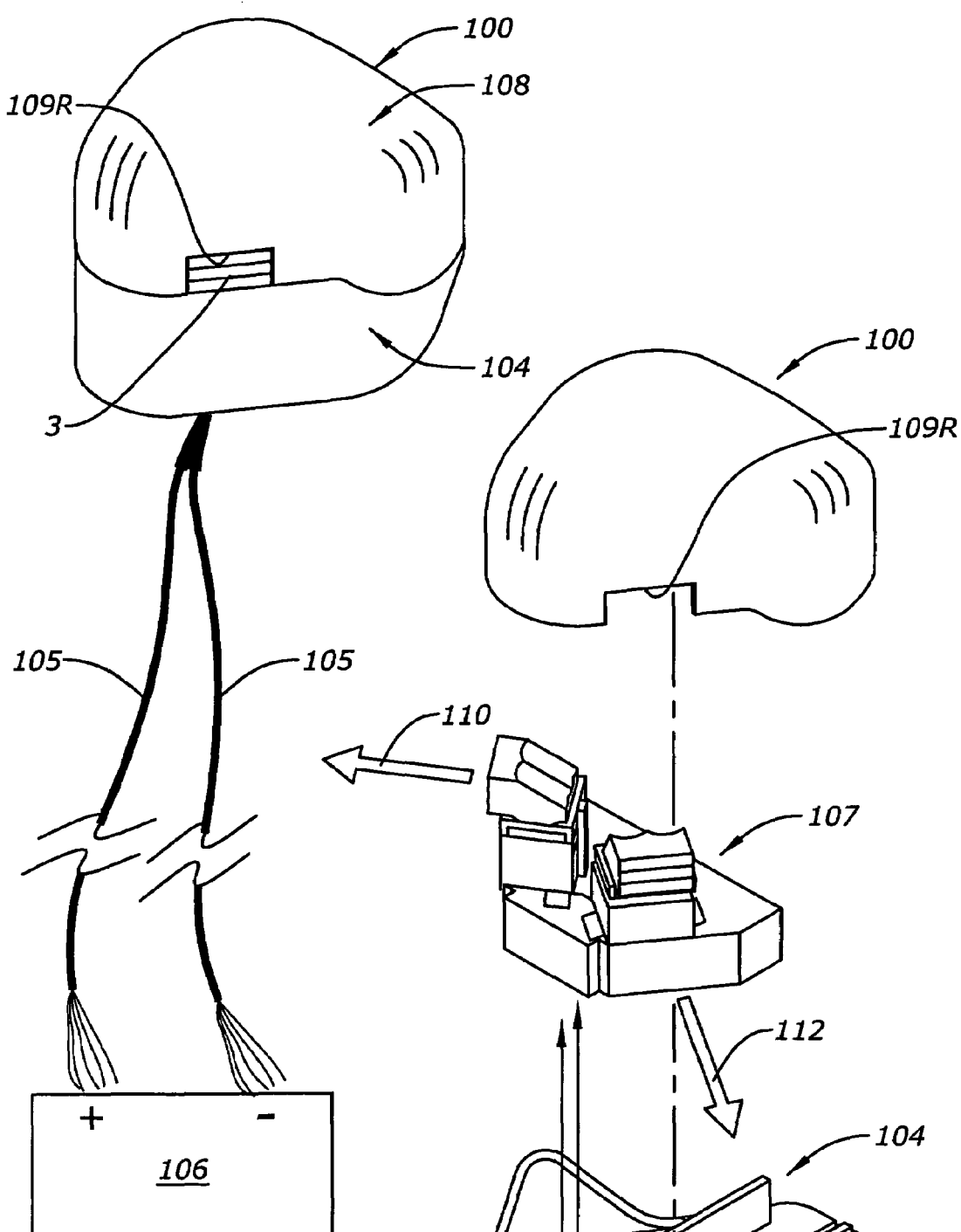
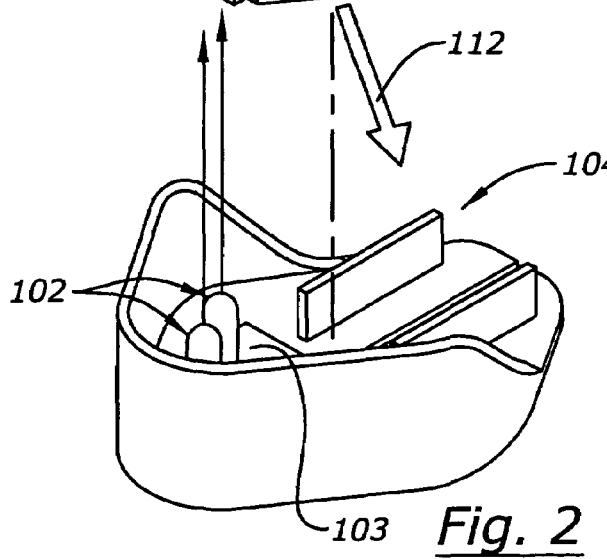
Fig. 1
Fig. 2

1. OPTICAL SURFACES MUST BE POLISHED A2 OR BETTER
2. PART MUST BE GATED TO MOLD WITHOUT SINK OR BUBBLES IN THICK SECTIONS
3. TOOLER IS RESPONSIBLE ACHIEVING A WELL PACKED OUT PART
4. NO PARTING LINES IN OPTICAL SURFACES
5. POLISH ALL SURFACES FREE FROM MACHINE MARKS

UNLESS OTHERWISE SPECIFIED
DIMENSIONS ARE IN INCHES
TOLERANCES ARE:
DECIMALS          ANGLES
.XXX + ±.001"     .XX± .1deg

APPARATUS AND METHOD OF GUIDING AND SHAPING LIGHT FROM LIGHT SOURCE

CROSS-REFERENCE TO RELATED APPLICATIONS

This application claims benefit of U.S. Provisional Application 60/335,011 filed Feb. 5, 2002.

BACKGROUND OF THE INVENTION

1. Field of the Invention

The present invention relates to apparatus and methods for guiding light from a light source, and in particular, to apparatus and methods for controlling and redistributing light from a relatively small light source or sources, or according to specific light pattern requirements.

2. Problems in the Art

Lighting applications, both required and elective, continue to increase and evolve. The nature of light energy many times allows multiple solutions to the same lighting goal. Therefore, although a lighting application can be generally defined, and there may exist one or more purported solution or solutions to reasonably meet the needed function, there is usually room for improvement in how the function is accomplished.

One example is in marine and automotive lighting. Government or industry regulations require running or safety lights, including for night-time or low light conditions. The regulations generally define the function of such a light, and perhaps at least some characteristics of the light output (e.g. intensity, uniformity, pattern, color).

The generation and/or manipulation of light can take many forms. A desired output can be defined, but there may be a variety of ways to achieve the output. Even for marine and automotive uses, there is no single light generation solution. One reason for this is the physics of light. For example, light energy can be produced in a number of ways. Current light source examples include, but are not limited to, incandescent, HID, and fluorescent. But each of these sources is available in different sizes, intensities, power ratings, etc. A further example is that light tends to disperse from the source, but can be controlled or manipulated by refraction, reflection, conversion, and other methods. On the other hand, light tends to lose energy during such manipulations.

But in addition to factors associated with the physics of light, practicalities in designing and implementing lighting applications must come into play in most situations. Examples include, but are not limited to, such things as constraints related to size, cost of production, cost of operation, energy consumption, safety, and complexity. Such issues are relevant to most marine and automotive lighting applications.

Therefore, as can be appreciated, most lighting applications present the opportunity for improvement because of the plurality of factors and variables involved. This allows for continued innovation and improvement in lighting solutions, even for what might be considered relatively non-complex lighting applications.

A very specific example in marine lighting is illustrative. A bow light, by regulation in the United States, must show a blue-green color on the starboard side and red pattern on the port side. One regulation requires that the blue-green and red lights must be in a specific pattern (basically rectangular—15 degrees in height total included angle, the centerline being horizontal; 112.5 degrees in width; with relatively sharp cut-off at the perimeter), have a minimum intensity (viewable to the naked eye from at least 1 or 2 miles away), and have a transitional area between green-blue and red in a precisely defined area (3 degrees wide, so that a viewer will normally see only blue-green or red, depending on relationship to the boat). The solution to these requirements, while staying within practical size, power, cost, and complexity limits, is not trivial.

For some time bow lights, and other safety or running lights for boats, have used incandescent bulbs and colored lenses. Incandescent fixtures in one sense are relatively economical, having the luxury of decades of development, and relatively high intensity for common commercial light sources. Again, however, it is not trivial to meet the specific requirements of, for example, a bow light such as articulated above, or to do so in an optimal way, balancing practicalities.

With regard to marine bow lights, light requirements are often given as a set of horizontally and vertically oriented points which define the required intensities at specific angles. Because these points are typically oriented on a rectangular coordinate grid, the resulting requirement is rectangular in angle space. In contrast, the typically non-rectangular light output of an unlensed light source is an inefficient pattern for meeting the requirements. In addition, marine lighting requires sharp cutoffs in the output intensity distribution to achieve light output requirements. This presents an additional set of problems with respect to design of a light, including a bow light, that meets industry standards.

In the bow light example, if an incandescent source is used, the incandescent light must be guided or controlled in a manner to conform to the rectangular output regulations. This usually requires lens(es) and/or reflectors which adds complexity and cost. Additionally, it is generally desirable that a bow light be as small as possible and low profile. Such strictures many times require compromises and/or additions to achieve the required light output.

There has been a need for improvement in bow lights and similar lights relative to incandescent fixtures using combinations of lens, reflectors, and colored filters. Attempts have been made. For example, several attempts to improve bow lights use light emitting diodes (LEDs) as the light source. Advantages of LEDs over incandescent sources include very low power consumption (e.g. 1.0 watt versus 5 to 10 watts for incandescent), robustness (good shock resistance), and very long life (20 K–100 K hours). But disadvantages include, among other things, higher cost and relatively narrow distribution pattern. Also, LEDs generally emit a conical light pattern if unlensed or unreflected.

Present LED based bow lights try to balance the advantages and disadvantages. One example uses a plurality (e.g. 7 to 10 LEDs for each side) of T 1¾ style LEDs with each LED source positioned at specific angles to generate overlapping conical output distributions which meet the bow lens lighting requirement. However, it is very difficult to achieve accurate alignment of each of the individual LEDs to meet the cutoff specification. This increases cost and quality variances in these products. Additionally, the design is wasteful of light energy at least on the vertical axis because the output of individual LEDs is usually conical and individual LED patterns must have significant overlapping to meet bow light output requirements. Further, the number of LEDs used and the optical structure required is significant in terms of cost to manufacture and operate.

Another example uses a custom manufacturing process to place LED dice directly on a circuit board. The dice are arranged in a linear pattern. Several high energy dice are used to create the required output intensity. This generates a very reliable cutoff point but the optical efficiency is poor. The number of sources results in a single "tall" source which forces the package size to be relatively large in the vertical direction as well as requiring significant power consumption, even for LEDs. Again, the substantial LED energy used and the other structure needed to produce the light output is significant in terms of manufacturing costs and operational costs.

Thus, a need exists in the art for improvement in bow lights and similar lighting. For example, there is a need for improvement in taking a spherical or conical output from a light source and efficiently manipulating it into a different pattern, including patterns that demand specified intensity gradients and relatively precise perimeter cut-offs. Other lighting application examples, both in and outside the marine and automotive fields, exist with similar issues and problems. As can be appreciated, similar or analogous issues exist for lighting applications other than automotive or marine related. A need also exists for improvement for such applications.

BRIEF SUMMARY OF THE INVENTION

Objects, Features and/or Advantages

It is therefore a primary object, feature and/or advantage of the present invention to present an apparatus and method which improves over the state of the art.

Additional objects, features and/or advantages of the invention can include an apparatus and method for lighting which:

(a) can efficiently and relatively precisely generate and distribute light energy in desired patterns;

(b) is relatively economical, to manufacture and to maintain and operate;

(c) is durable and long lasting;

(d) is flexible and adaptable for a variety of requirements, sizes, and applications.

These and other objects, features, and advantages will become more apparent with reference to the accompanying description, drawings, and claims.

BRIEF DESCRIPTION OF THE DRAWINGS

FIG. 1 is a perspective view of one possible embodiment of the present invention in the form of a bow light for a marine vehicle.

FIG. 2 is an exploded view of FIG. 1.

FIG. 4I is a side elevation of FIG. 4H.

DETAILED DESCRIPTION OF AN EXEMPLARY EMBODIMENT ACCORDING TO THE INVENTION

Overview

Figure 3:
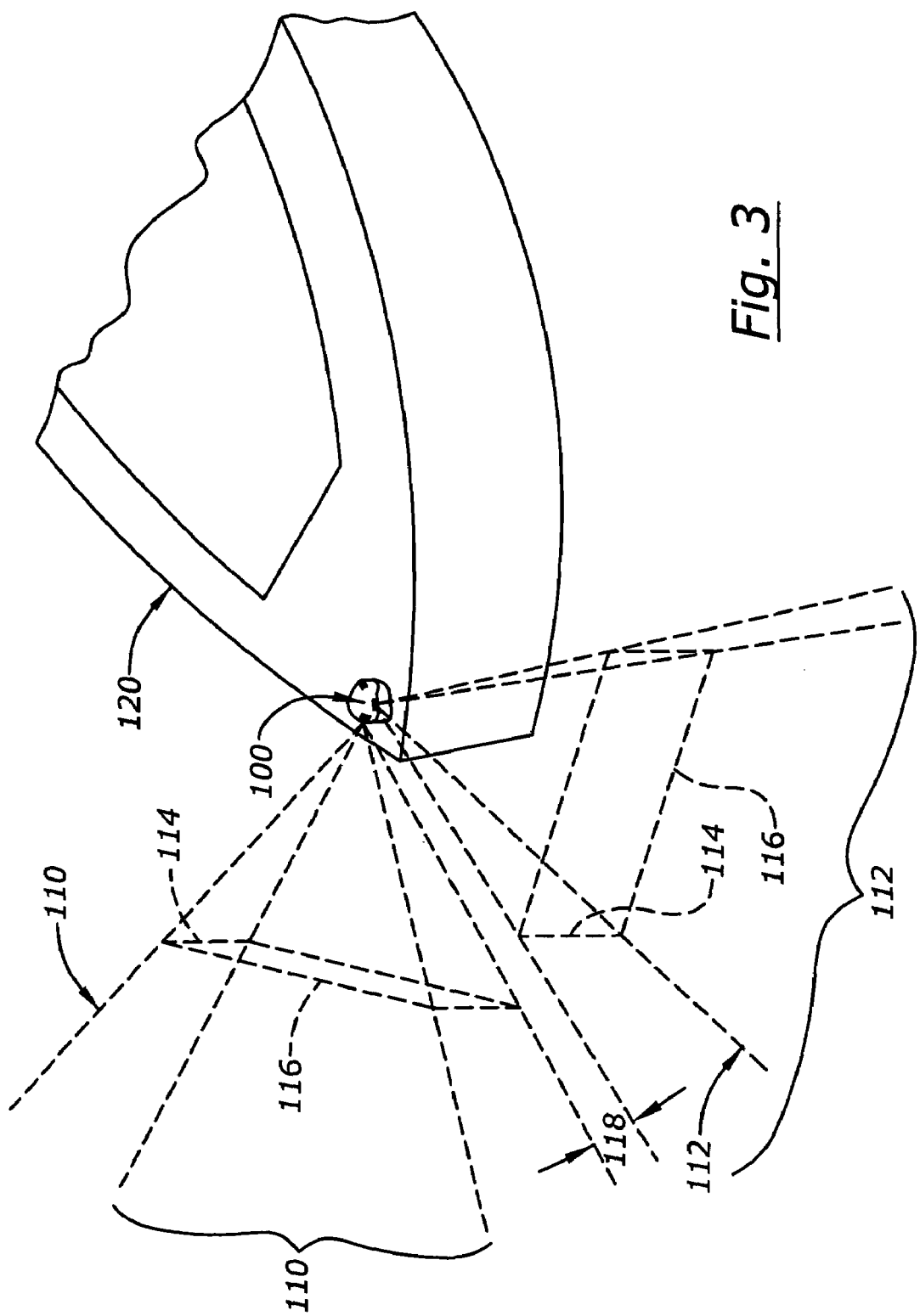
FIG. 3 is a fragmented illustration of the device of FIG. 1 positioned on the bow of a boat.

To gain a better understanding of the invention, one particular exemplary embodiment will now be described in detail. It is to be understood that this exemplary embodiment is but one form the invention can take, and is given for illustrative purposes only, and not to limit the various forms the invention can take and be implemented.

When describing the exemplary embodiment, frequent reference will be taken to the accompanying drawings. Reference numbers and/or letters will indicate certain parts or locations in the drawings. The same reference numbers or letters will indicate the same parts of locations throughout the drawings unless otherwise indicated.

General Environment of Exemplary Embodiment

Referring to FIG. 3, this exemplary embodiment of the invention is a bow light 100 for a marine vehicle, e.g. recreational motorboat 120. Such bow lights are well-known. Regulations or specifications (e.g. American Boat and Yacht Council ("ABYC") marine motorboat specifications) cover such lights.

FIG. 3 generally illustrates a bow light on a boat 120 and a bow light beam pattern under ABYC specifications described previously herein. The ABYC specification dictates a blue-green starboard-side pattern should issue from bow light 100 (shown generally at reference number 110), and a similar red port-side pattern (generally at reference number 112). Each pattern 110 and 112 should be 15 degrees in the vertical direction, with horizontal center line (ref. no. 114) and 112.5 degrees in the horizontal direction (ref. no. 116). A 6-degrees transition angle (ref. no. 118) should exist between blue-green pattern 110 and red pattern 112. The ABYC specification has other criteria, including intensity, which are publicly known and available and incorporated by reference herein.

The ABYC specification follows the intended function of the bow light, to provide a visual indication of the existence of a watercraft and its general orientation to a viewer of the watercraft at night or in low light conditions. It is an important safety feature.

As such, bow light 100 has to be mounted to the bow of boat 120. It is desirable that it be relatively small in size and low in profile, rugged, and marine-grade to stand that environment over time. It is generally powered by the boat's electrical storage battery.

Exemplary Apparatus

FIGS. 2 and 3 illustrate in more detail bow light 100. It includes three general components; a base 104, what will be called a light guide 107, and a cover 108.

Base 104

One or more light sources 102 (here six sources) are mounted on a circuit board 103 in a base 104. Appropriate circuitry connects light sources 102 to power leads 105, which are adaptable to be connected to an electrical power source (here on-board battery 106—12 or 24 VDC). Base 104 includes an outer shell (e.g. plastic, fiberglass, stainless steel, die-cast or pre-cast metal with chrome plating) that can be mounted to boat 120 (via through-holes 134 by screws or bolts or otherwise), and has upward extending walls that define a receiver or mount for the circuit board.

Cover 108

Cover 108 (e.g. plastic, fiberglass, stainless steel, die-cast or pre-cast metal with chrome plating) is mountable over and to base 104. It can include structure that interfit or mate with complementary structure in base 104 to fit together to form basically a housing for bow light 100. Cover 108 includes two openings 109S and 109P (for starboard and port) through which beam patterns 110 and 112 issue.

Light Guide 107

Light guide 107 is configured to seat or fit within base 104 and cover 108 when bow light 100 is assembled. Its function is to guide, control, and manipulate light from the light source(s) to openings 109S and P.

As can be appreciated, by ways known in the art or well within the skill of those skilled in the art, the combination of components of bow light 100 can be manufactured to be marine-worthy. For example, in a production model, light sources 102 and other electrical or electronic circuitry or components can be potted in a water-proof manner to resist corrosion. Leads would be insulated and water-proof. Also, base 104 and cover 108 can be manufactured and assembled in a water-tight or proof manner, including using adhesives, gaskets, or other substances towards that end.

When assembled (FIG. 1), bow light 100 presents a relatively small device (e.g. here approximately 1 inch tall, 2 inches wide, and 2 inches deep at widest perimeter dimensions) that is relatively low profile and thus less likely to be damaged or obstructive while still performing to specifications for a bow light.

Light Sources 102

Figure 7:
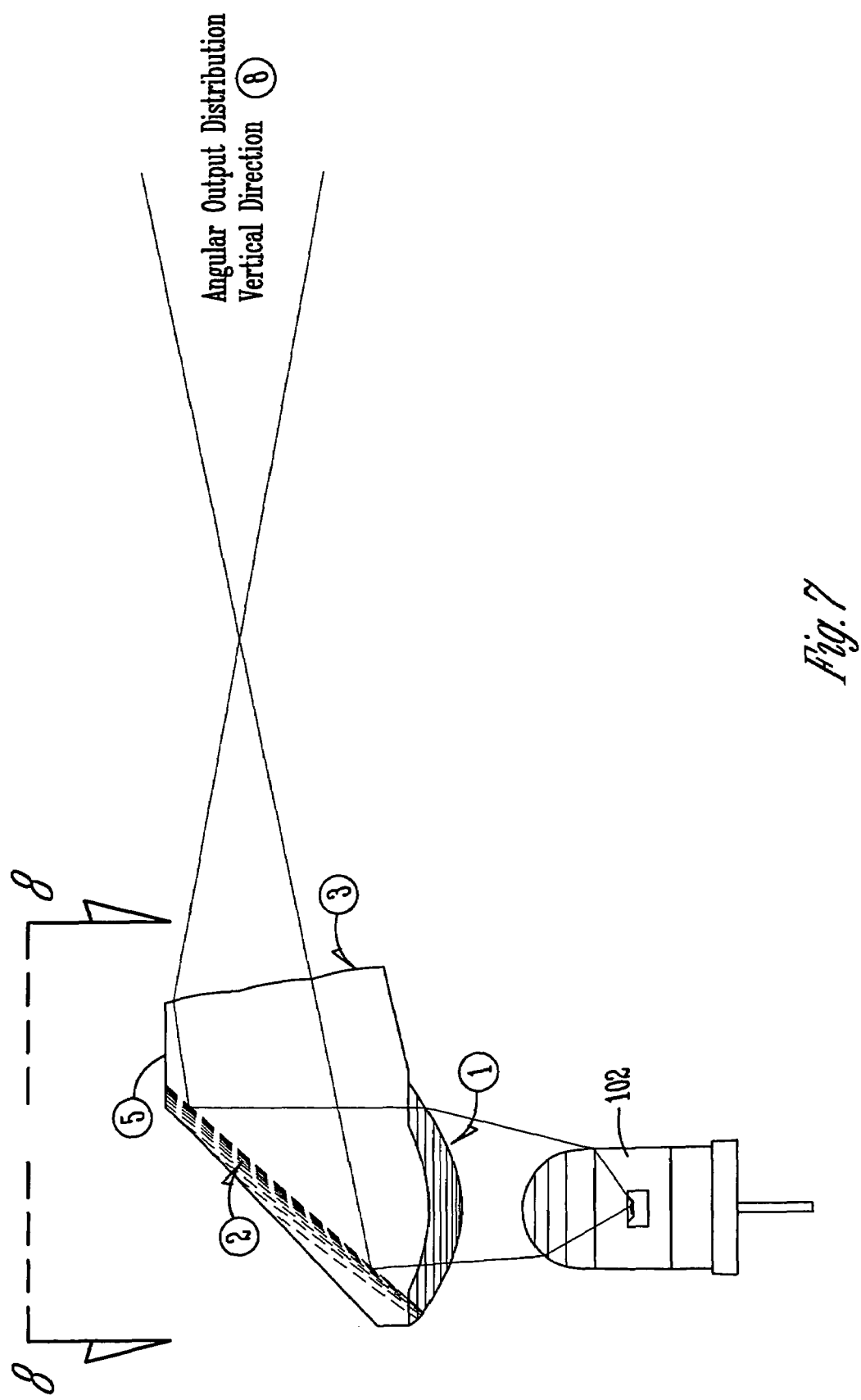
FIG. 7 is an enlarged, isolated sectional view taken generally along line 7—7 of FIG. 4, and including a light source in relative position.
Figure 8:
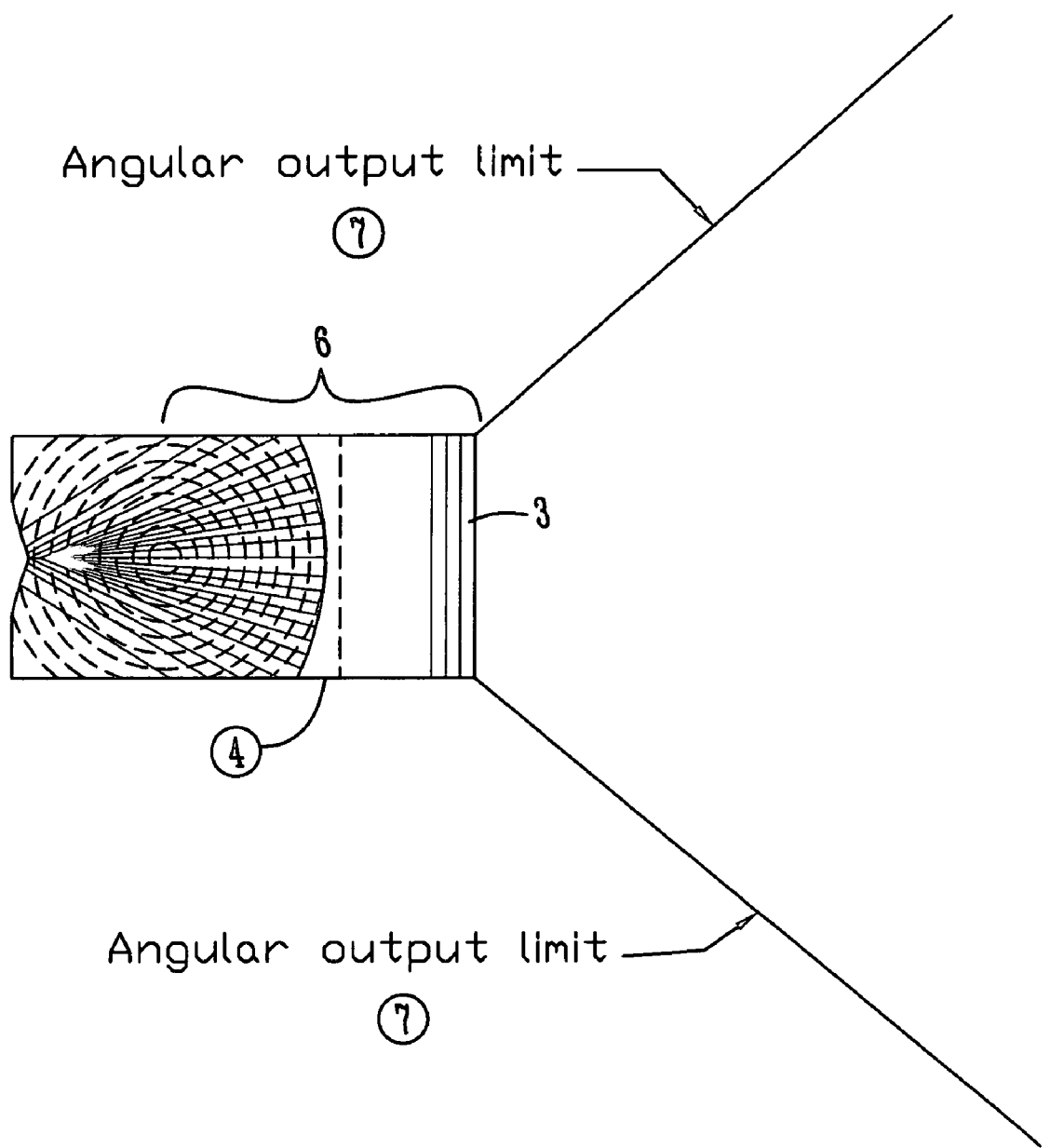
FIG. 8 is a top plan view taken generally at line 8—8 of FIG. 4.
Figure 9:
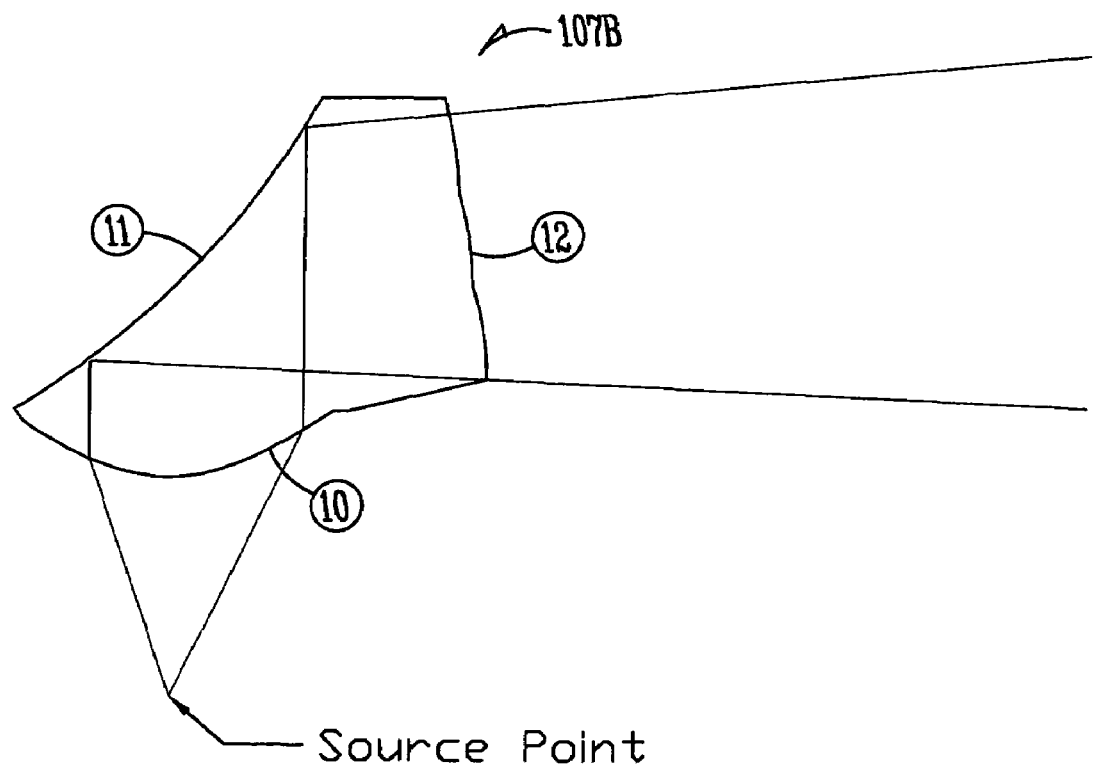
FIG. 9 is similar to FIG. 8 but shows an alternative embodiment of a light guide according to the present invention.

In this embodiment, two sets of a plurality of light sources 102 are illustrated aligned in series on opposite sides of base 104. One set (ref. no. 102S) can be Nichia (Japan) model number NSPE 510S blue-green LEDs. The other set can be Agilent (USA) model number HLMP-31-SV00 red LEDs. Both are commercially available, off-the-shelf. Set 102S corresponds with light pattern 110 and set 102P corresponds with light pattern 112. In the drawings, FIG. 2 illustrates two LEDs per set. FIGS. 4A–G and 5 illustrate three LEDs per set. As will be understood, member 107 can be designed for one LED per set, two LEDs per set, three LEDs per set, or even more, as will be clear from this description and drawings (e.g. FIG. 2 shows 2 LEDs per side; FIGS. 7–9 illustrate one LED relative to a light guide).

Preferably, each LED is mounted orthogonally to a plane (here generally the plane of the circuit board) and LEDs in each set are evenly spaced from one another and aligned in a second plane.

A control circuit would connect the LEDs to electrical power, such as would be known or well within the skill of those in the art.

FIGS. 4–8 illustrate in more detail light guide 107, which functions to guide light from light sources 102 and generate beam patterns 110 and 112, as previously discussed. Bow light 100 has three light sources per side. Each side is essentially a mirror image of the other, except one side issues a blue-green light pattern and the other a red light pattern (determined by the color output of the LEDs). It is also possible to have colored filters over the light source. Light guide 107 is a single, solid molded component (acrylic). It, in turn, has three main optical components.

Optical Surface 1

Figure 5:
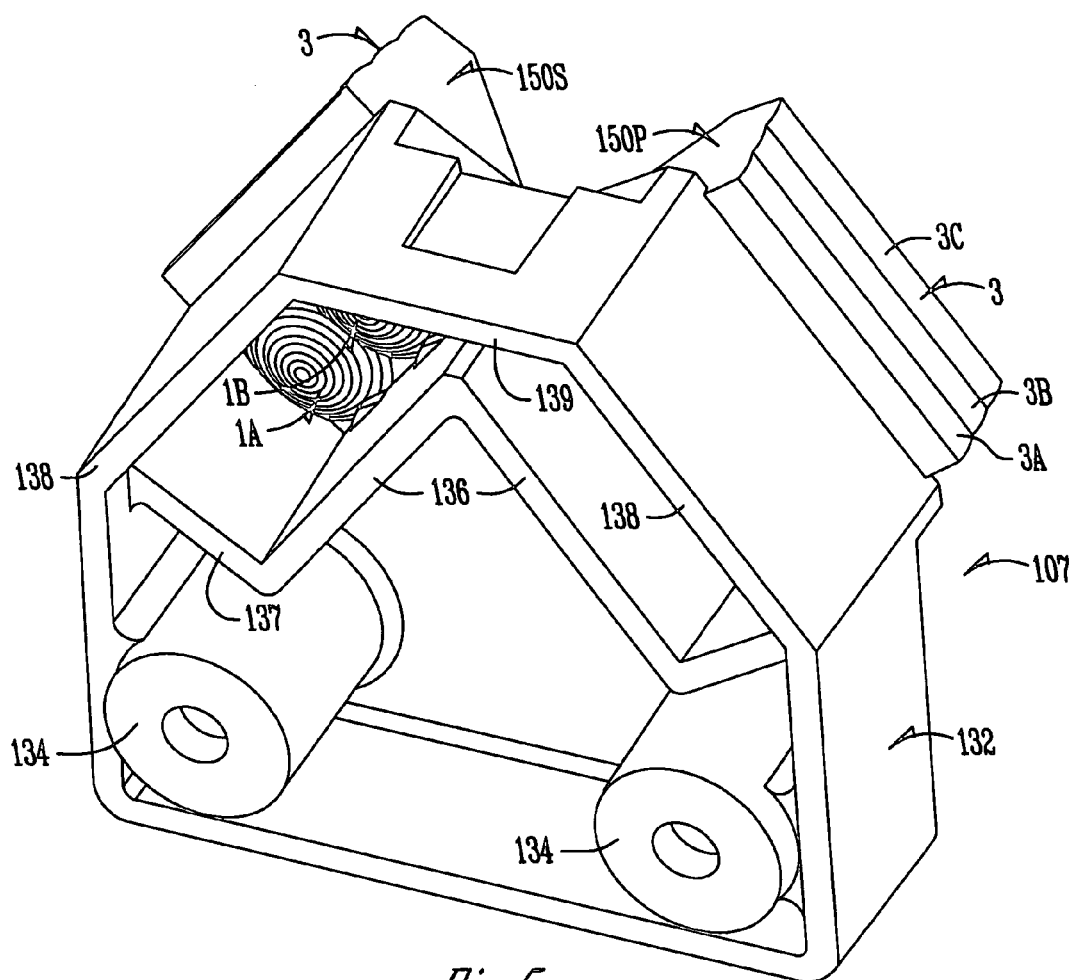
FIG. 5 is bottom view of FIG. 4.
Figure 6:
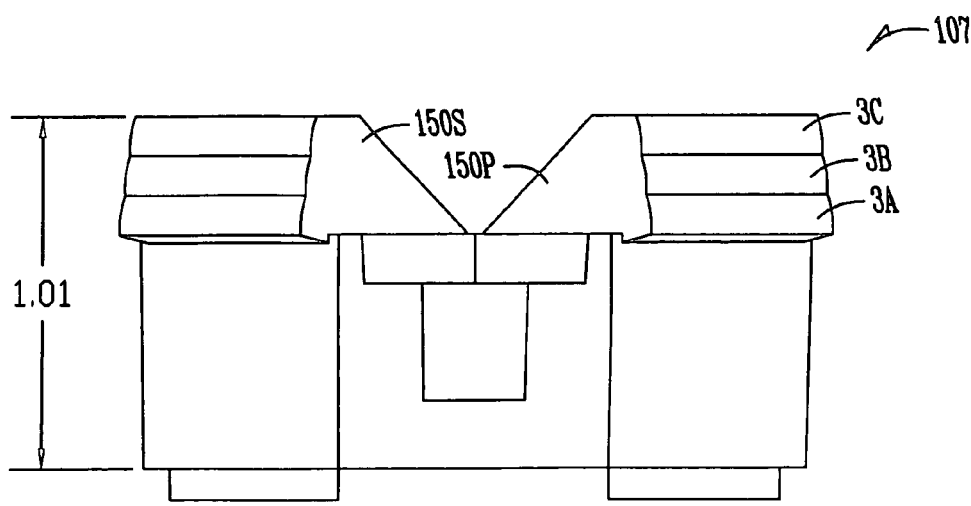
FIG. 6 is a front elevation view of FIG. 4.

First, a collection and collimating surface 1 for each LED of each set gathers light from the conical light output of its LED source 102 (e.g. approximately a 30 degree half angle cone of light) and directs it into the interior of guide 107 and onto what will be called optical surface 2 (see FIG. 7) Here surface 1 is generally convex and circular in perimeter (see FIG. 5). The distance between the top of LED 102 and the closest part of surface 1 is about 0.093 inch. Surface 1 has a diameter of approx. 0.33 inch (can be an axially symmetric revolved cut with square sides of approx. 0.30 inch by 0.30 inch). Its characteristics include convex surfaces and acrylic material, including a refractive index of 1.49.

FIG. 7 illustrates how light from LED 102 is collected and collimated by surface 1. FIG. 7 shows two beam traces from LED source 102 to surface 1 to indicate how the shape and configuration of surface 1 is designed to collimate the rays. Most other rays from source 102 would likewise be collected and collimated.

Optical Surface 2

As shown in FIG. 4, there is a second optical surface 2 for each LED (indicated by ref. nos. 2A, 2B, and 2C). Optical surface 2 is angled and curved generally convexly relative to the collimated light rays of its corresponding LED to spread and redirect the beam from surface 1 almost 90 degrees (see FIG. 7), and also spread the collimated light rays into a horizontal distribution pattern 7 (see FIG. 8). FIG. 7 carries forward the two rays from LED 102 that were collimated by surface 1 to show how surface 2 generally maintains collimation in the vertical plane. FIG. 8 illustrates, at reference numbers 7, the angular horizontal output limits for the beam. By referring to FIGS. 4, 7 and 8, the shape of surface 2 can be seen. FIG. 4 actually shows the back or non-reflecting side of surfaces 2, thus illustrating that they are not only angled (approximately 46.5 degrees) along their longitudinal axes with respect to the collimated beams from their respective light sources, but also curved convexly along their lateral axes (approx. 0.36 inch radius).

In this embodiment, surface 2 is somewhat more complex in shape and is not a regular surface. Surface 2 can be generally described as follows. It can be created by sweeping a flat section through a multi-segmented path such that the area of each lens segment determines the light energy at that specific angle. The areas were chosen to generate an even illumination distribution from the source used. Three dimensional ray tracing was used to correct for aberrations in an iterative process until an even illumination pattern was generated. The segments used are small enough that in practice a continuous curve is generated.

The convex shape of surface 2 relative to the source light reflects almost all the light (approx. 95%) internally for efficiency. FIG. 8 generally illustrates that definition by the added radiating lines and concentric circles overlaid to surface 2 in the top plan view of FIG. 8.

Thereafter, light is directed into what will be called the waveguide portion 6 (see FIG. 8) of light guide 107 and directed to the third optical component, exit surface 3.

Optical Surface 3

Exit surface 3 is shaped into the exterior surface of light guide 107 (see three concave horizontal portions 3A, 3B, and 3C). Surface 3 produces the vertical distribution of the rectangular pattern that emerges from bow light 100 (see FIG. 7). Surface 3 is made up of three similar slightly internally concave, externally convex (0.238 inch radius) segments extending horizontally across the output face of guide 107. The two rays previously discussed are shown in FIG. 7 to be converged by exit surface 3. Surface 3 is divided into the three segments 3A, 3B, and 3C but could be one segment, two segments, or more than three, if shaped to create the desired vertical spread.

As illustrated in FIGS. 7 and 8, this combination of optical surfaces and the other characteristics of light guide 107 collects the relatively conical light output issuing from an LED 102, collimates it, spreads it evenly in a horizontal direction, and controls that even distribution in both the horizontal and vertical directions to achieve the beam pattern for each side of the bow light.

By essentially duplicating the optical components for each LED, the output pattern is still generated but the intensity of the output light can be increased, as desired. One LED per side could be used with a corresponding set of optical surfaces 1, 2 and 3. Here three LEDs per side, each having a corresponding set of surfaces 1, 2, and 3, are used to achieve at least a 2 mile range for the normal human eye for either starboard or port side patterns. The beam patterns from each LED are essentially overlapped to triple the intensity of one LED, to get greater range. It is to be understood, however, that on the order of just three LEDs per side has been found to work for standard bow light 2-mile range requirements.

FIG. 5 illustrates how individual optical surfaces 1 can be formed in light guide 7 for corresponding LEDs. They are positioned directly over each LED. See also FIG. 4E–G, and FIG. 7. FIGS. 4A–G, 7 and 8 illustrate how individual optical surfaces 2 can be formed in light guide 7 for corresponding LEDs. These surfaces can be formed in the molding process. They are all formed in what will be called blocks 150S and 150P of guide 107. Some finishing or polishing of the tooling to create member 107 may be necessary. The surfaces of guide 107, especially the optical surfaces, can have SPI A-2 optical finish, of the type plastic eye glasses utilize. Other finishes or processing are possible.

FIGS. 7 and 8 illustrate, for a single LED and single corresponding surfaces 1 and 2, how light is controlled internally of light guide 107 and presented for output through optical surface 3.

Dimensions of light guide 107 are indicated in the drawings. Dimensions in the drawings are inches unless otherwise indicated. It is to be understood that sidewalls 4 (see FIG. 8) are angled (e.g. less than 42 degrees for acrylic) relative to the horizontally spread light to be totally internally reflected and to direct the light which would otherwise miss surface 3 back into the pattern. This assists in the efficiency of the device. Additionally, top surface 5 (FIG. 7) is internally reflective to keep the light in the waveguide.

Figure 4A:
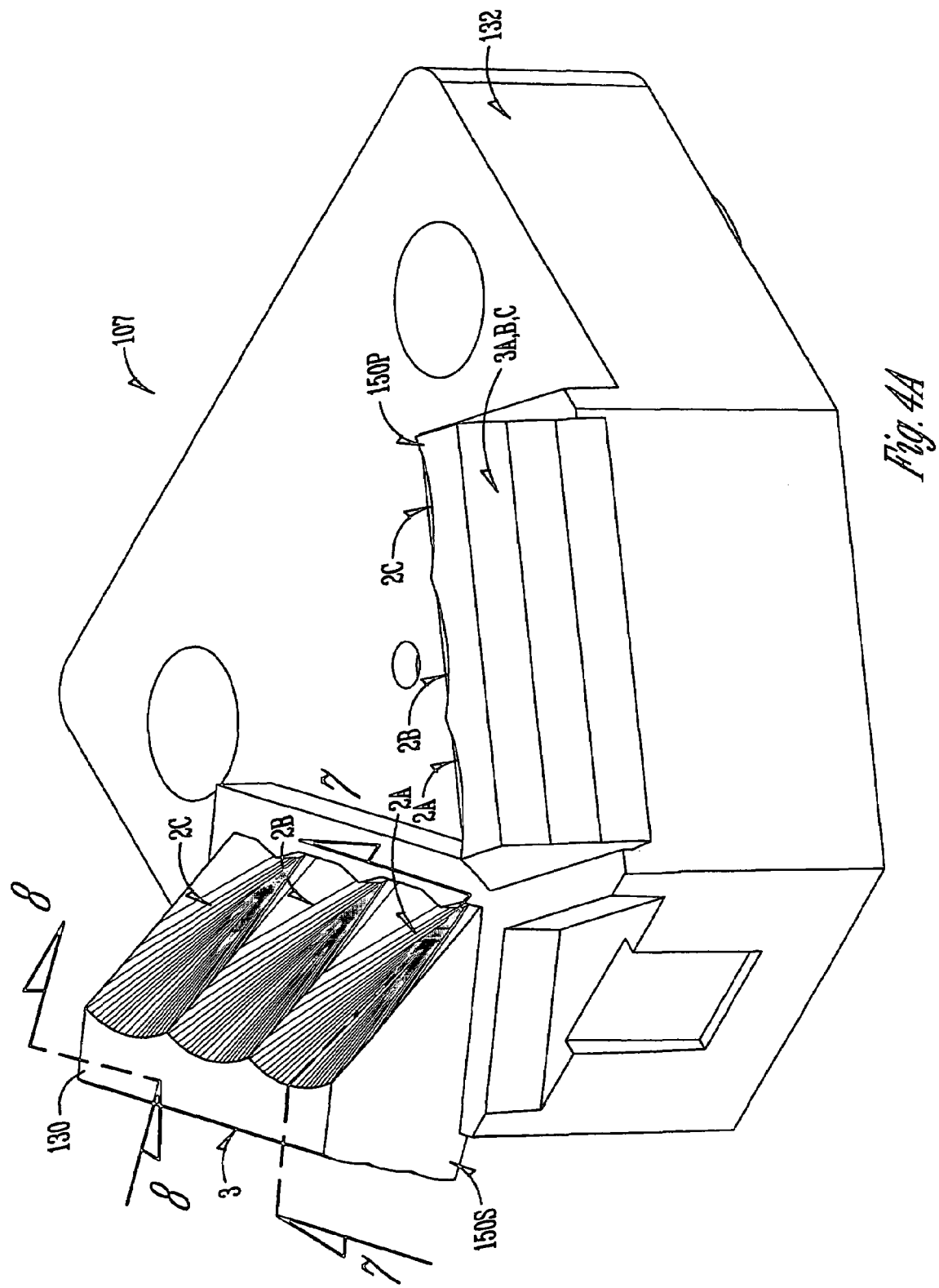
FIG. 4A is an enlarged perspective view of the light guide portion of the device of FIG. 2.
Figure 4B:
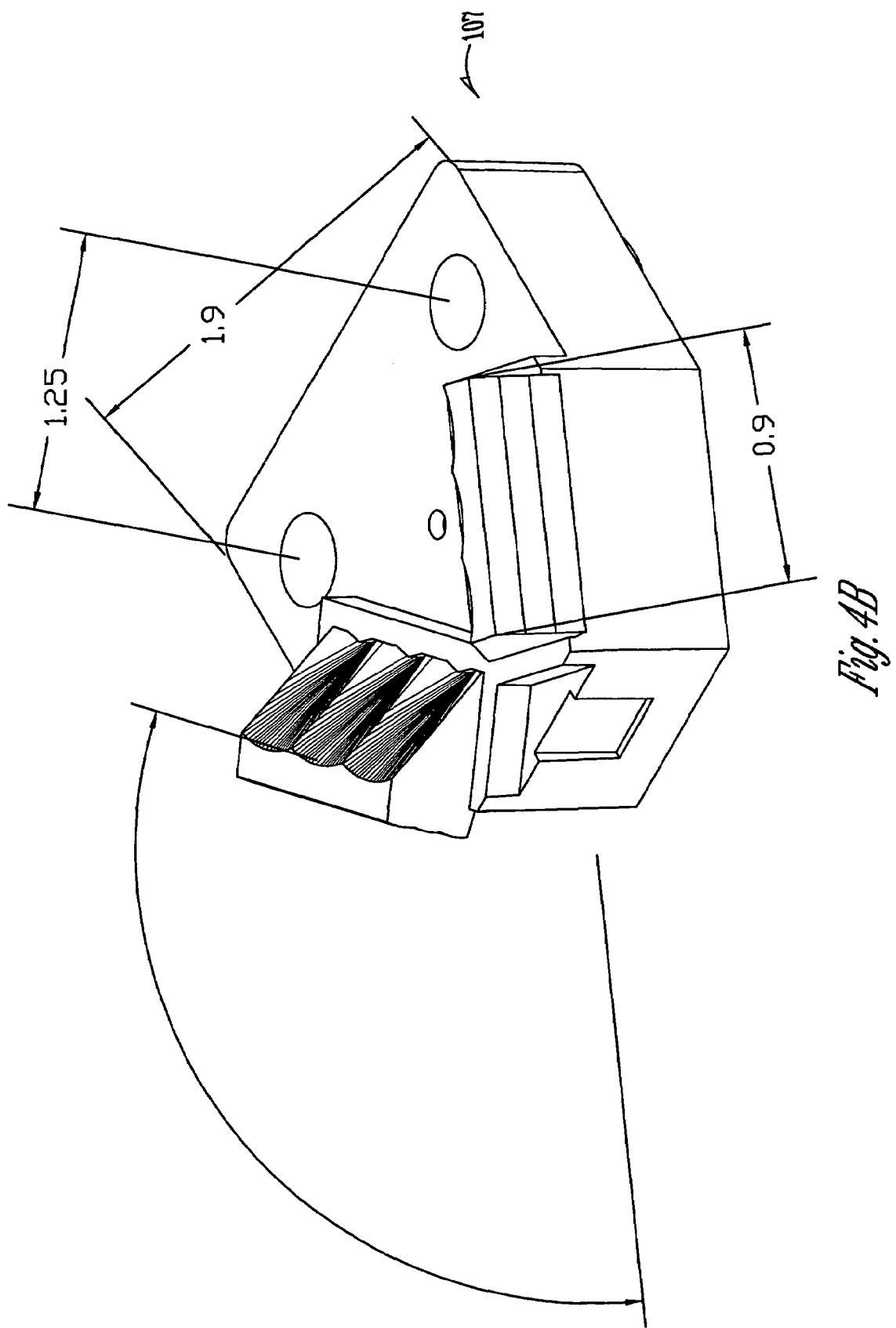
FIG. 4B is identical to FIG. 4A, but reduced in size.
Figure 4C:
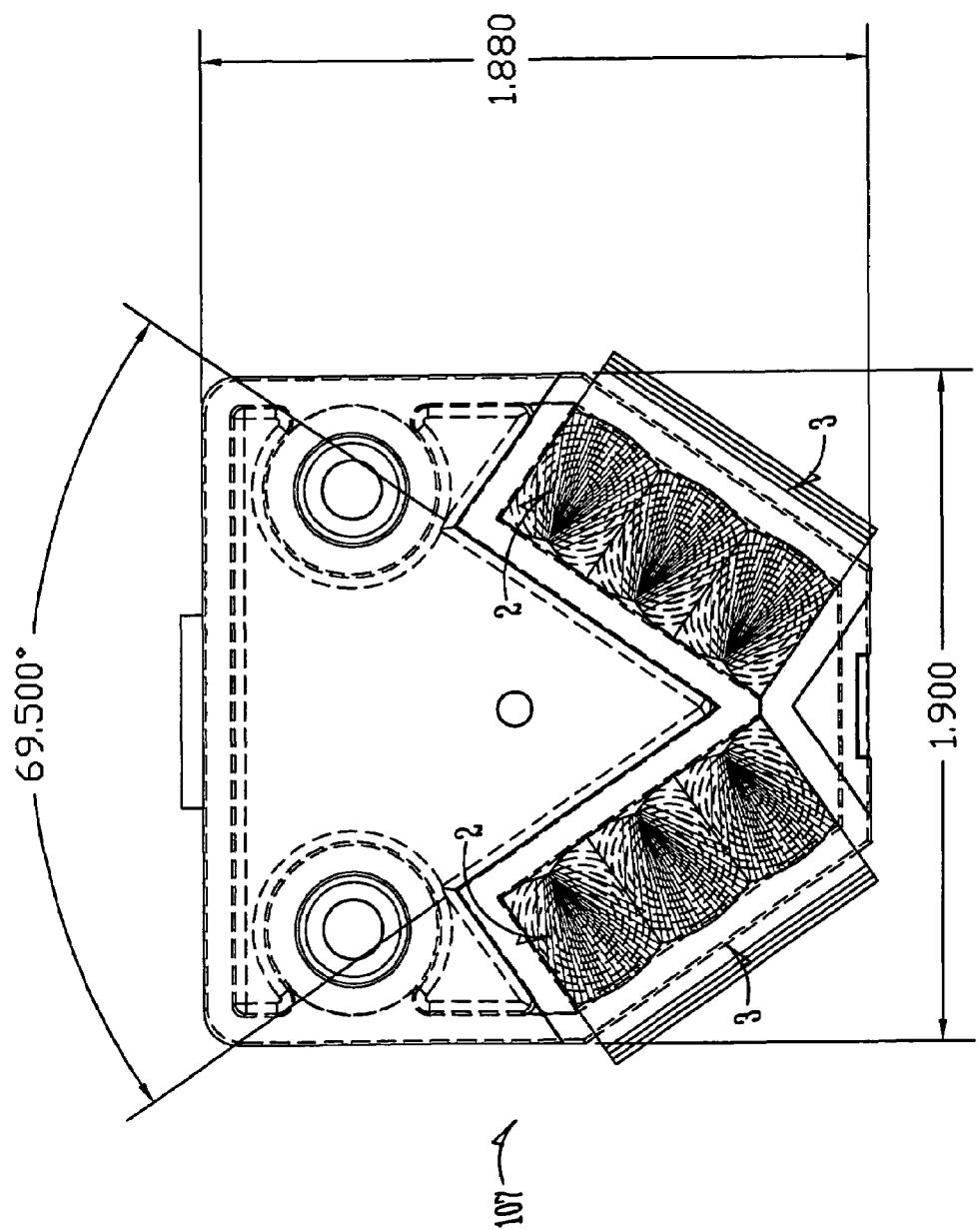
FIG. 4C is a top plan view of FIG. 4B.
Figure 4D:
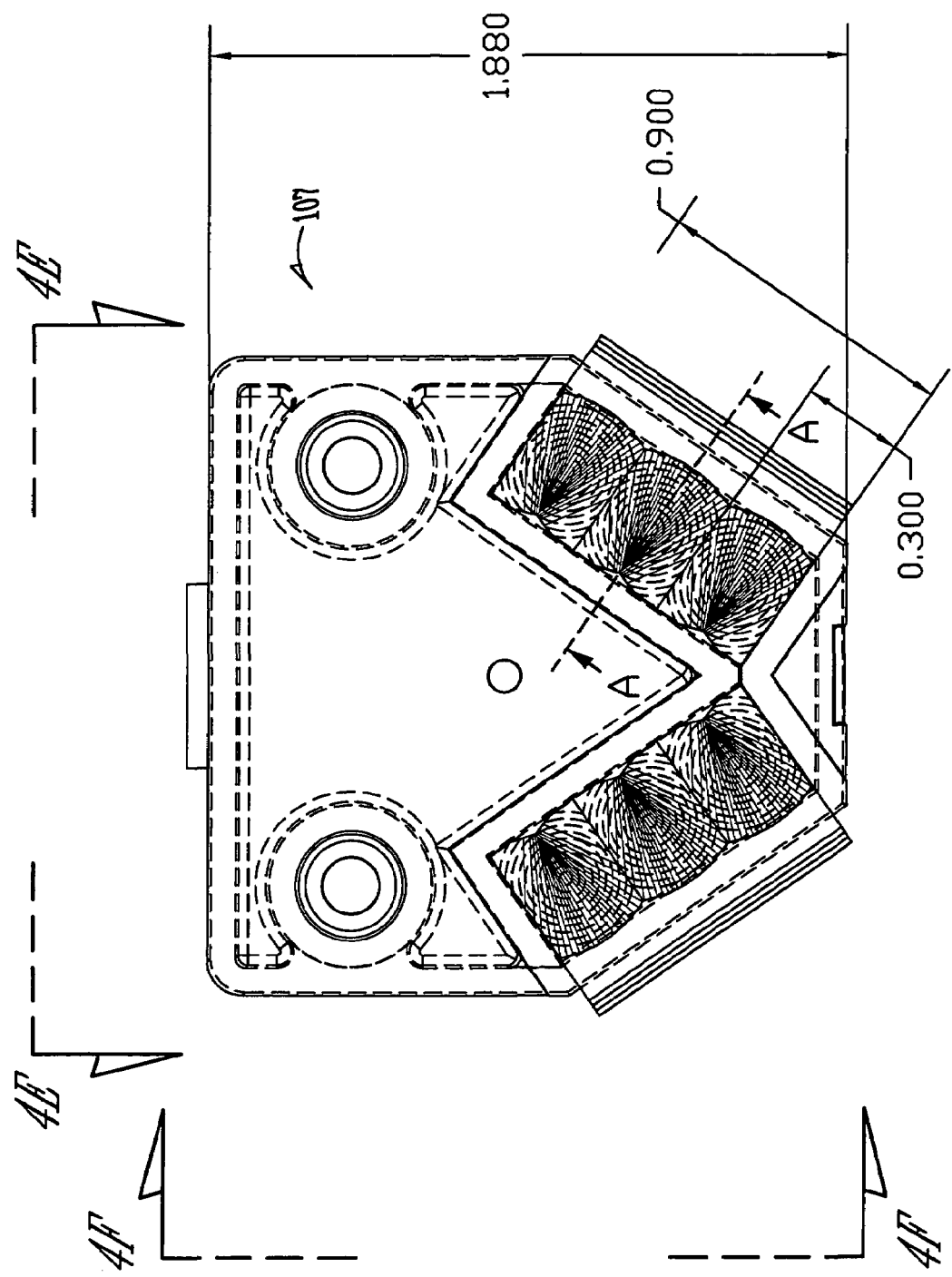
FIG. 4D is identical to FIG. 4C.
Figure 4E:
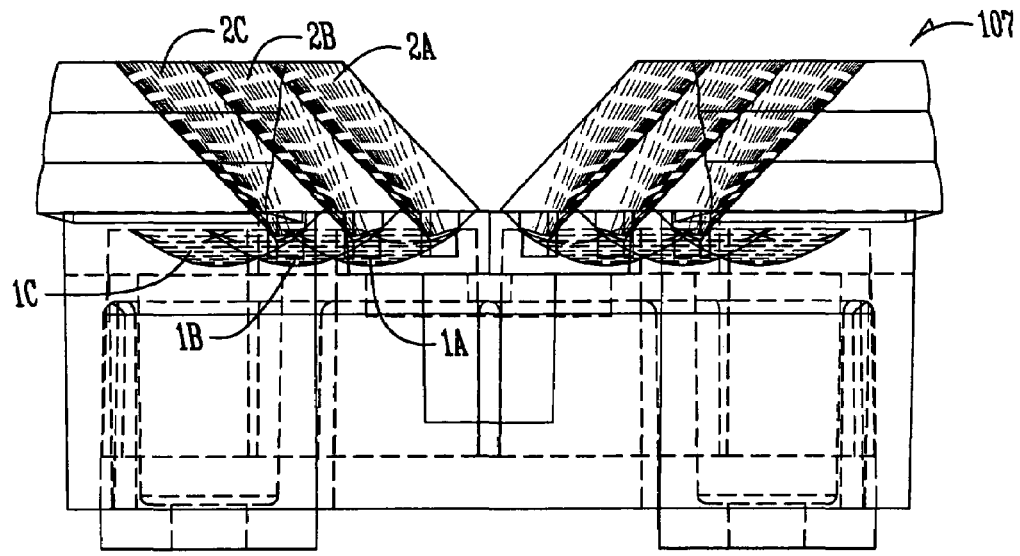
FIG. 4E is an elevation view of FIG. 4D from the direction of line 4E—4E in FIG. 4D.
Figure 4F:
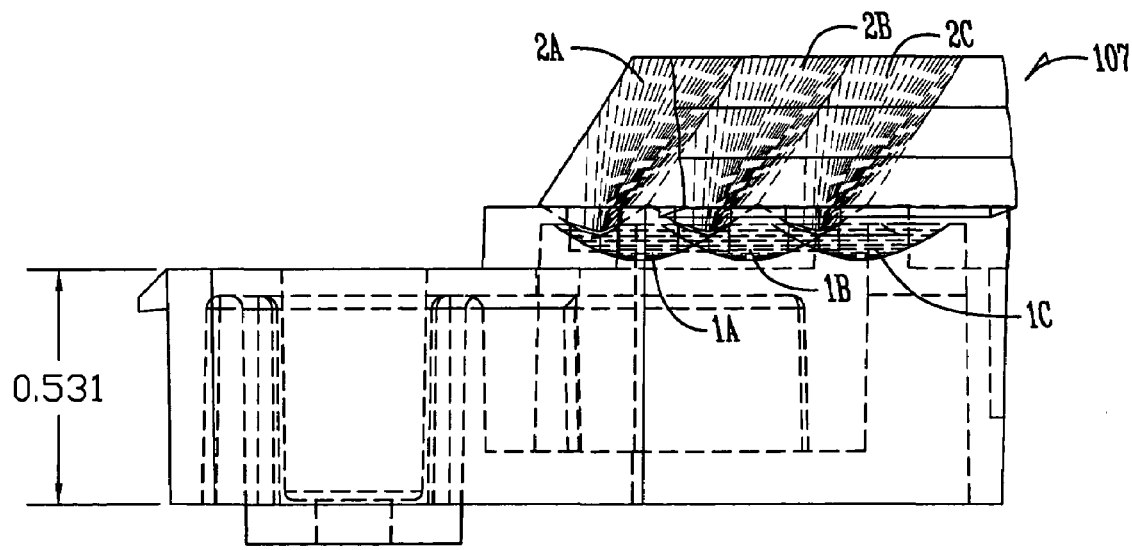
FIG. 4F is an elevation view of FIG. 4D from the direction of line 4F—4F in FIG. 4D.
Figure 4G:
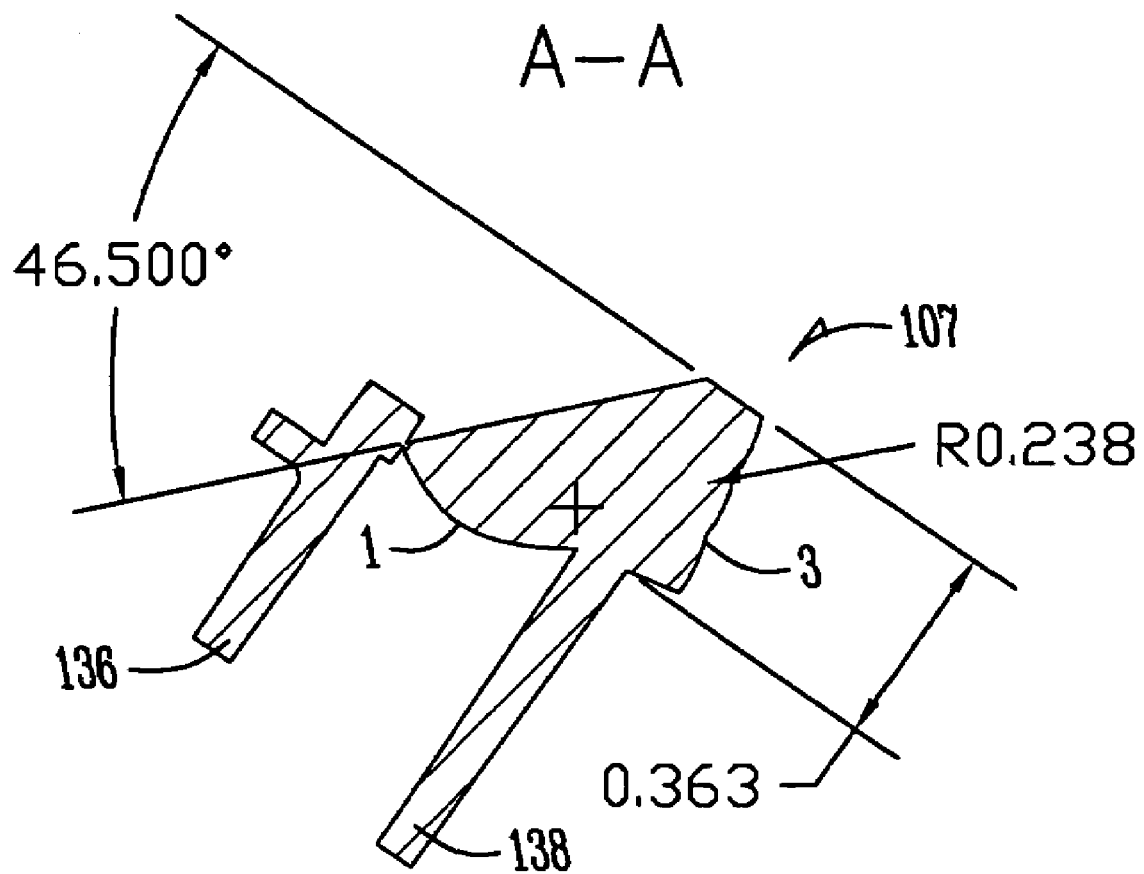
FIG. 4G is a sectional view taken along line A—A of FIG. 4D.
Figure 4H:
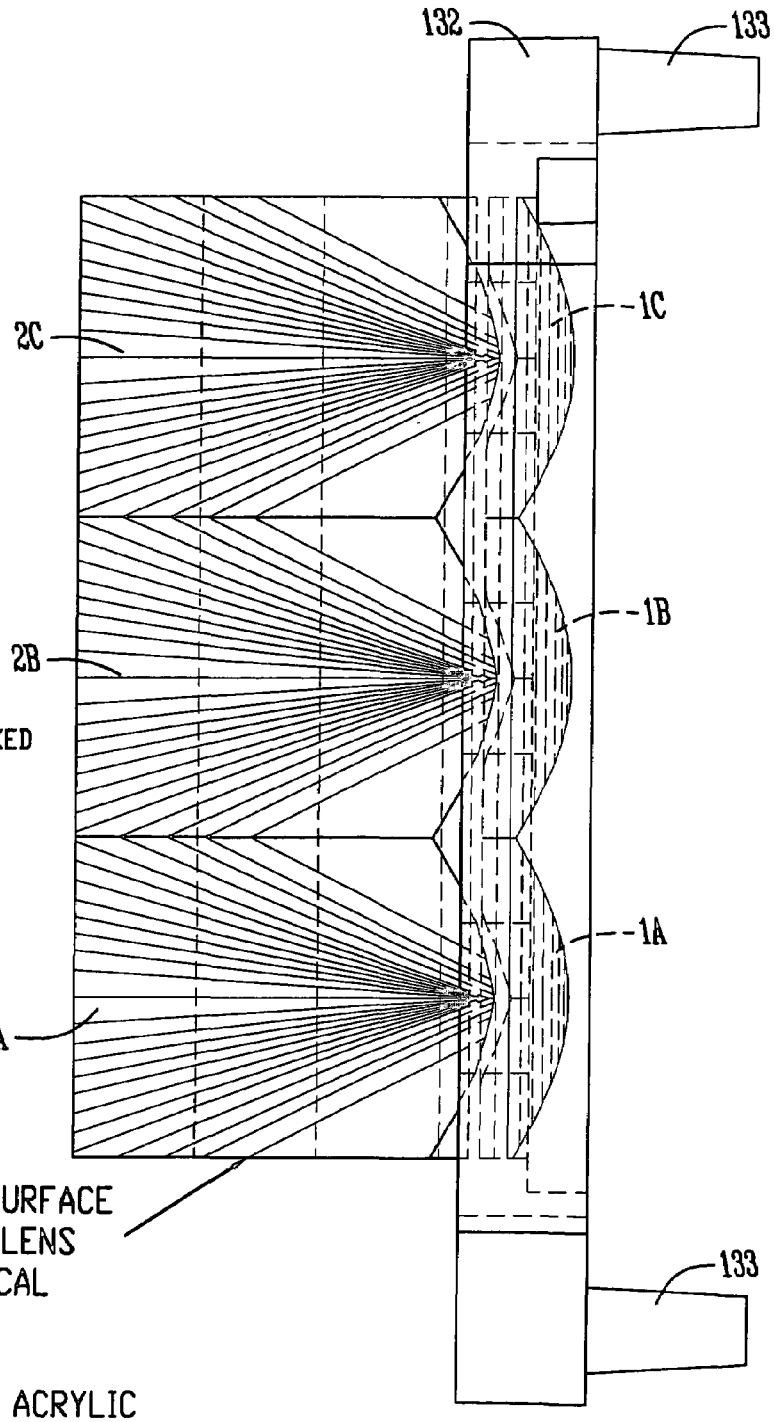
FIG. 4H is a top plan view of a light guide similar to that of FIGS. 4A–G, but with a different integral mounting structure for mounting the light guide, e.g., to a housing or base.
Figure 41:
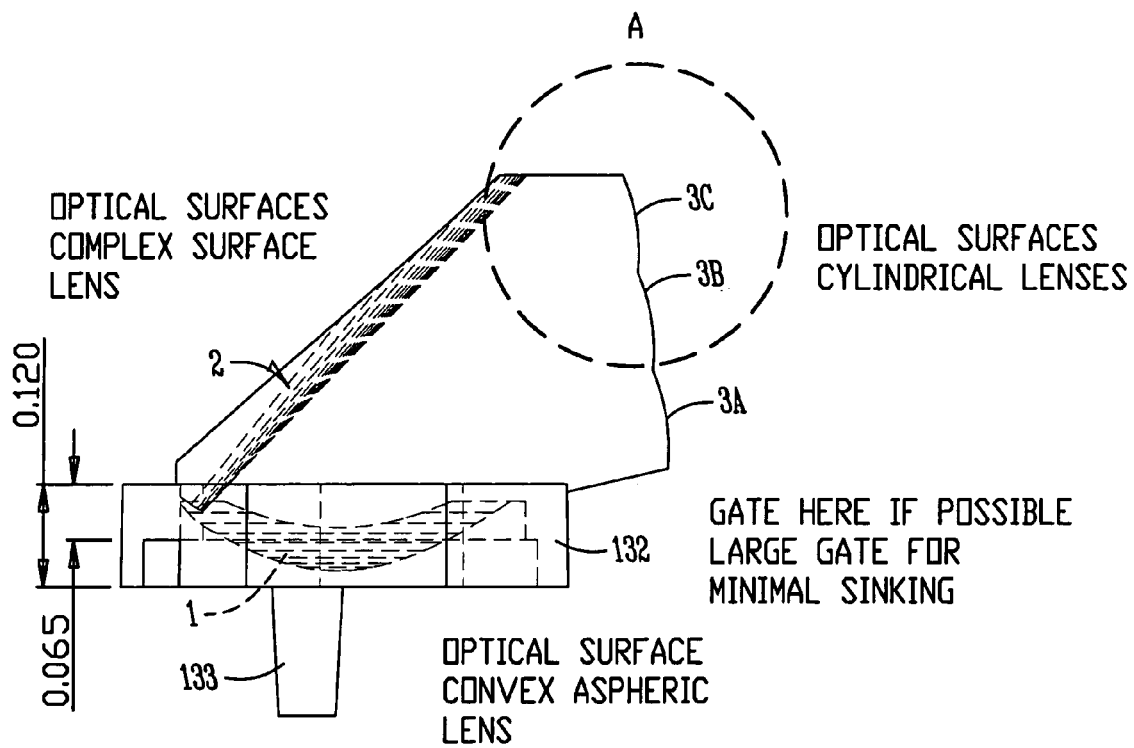
Figure 4J:
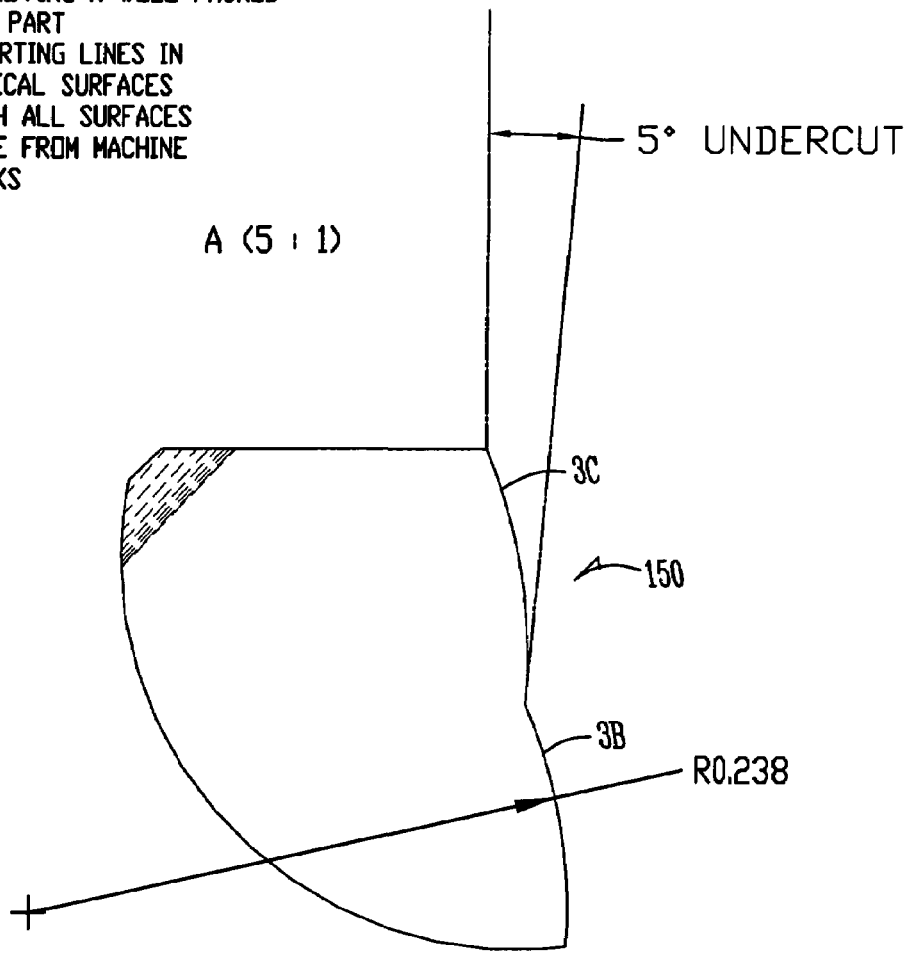
FIG. 4J is an enlarged partial view of the light guide of FIG. 4I, taken along line A—A of FIG. 4I.

FIGS. 4H–J show the same type of first surface 1, second surface 2 and third surface 3 for a light guide as previously described. Surface 1 comprises three linearly aligned, side-by-side externally convex shapes (essentially convex aspheric lenses 1A, 1B, and 1C) formed on the exterior of the one-piece acrylic light guide 107, each convex shape adapted to be aligned axially with an LED and to function to collect and substantially collimate light for its respective LED. Surface 2 comprises three side-by-side inwardly curved surfaces (2A, 2B, and 2C) formed in an exterior surface of piece 107. Externally, surfaces 2A–C are depressions in piece 107, but form partially convex surfaces for light passing through lenses 1A–C towards surfaces 2A–C. Lenses 1A–C are aligned with surfaces 2A–C such that substantially collimated light of lenses 1A–C is directed internally to a corresponding single surface 2A–C. Like previously shown and described, surface 2 functions to take the substantially collimated light from lenses 1A–C and create a pre-designed spread of each of the collimated beams on a first plane. By selection of the shape of surfaces 2A–C, that spread can be controlled. Surface 3 comprises three slightly outwardly curved side-by-side surfaces (3A, 3B, and 3C) formed on exterior of piece 107. Surfaces 3A–C are essentially cylindrical lenses elongated in a direction transverse to the three side-by-side surfaces 2A–C. As previously described, surfaces 3A–C control spread of the light reflected from surfaces 2A–C in a second plane generally orthogonal to the plane of spreading controlled by surfaces 2A–C. The various surfaces 1, 2 and 3 are configured and designed to take the output of three separate lights (here three LEDs), and collect, guide and shape that light, in a manner which is substantially totally internally reflective, using one-piece of acrylic with the surfaces that affect the light all formed on the exterior of the piece. In this manner, piece 107 can be molded or otherwise mass-produced from a single piece. Piece 107 is designed to produce a composite output beam of controlled spread in two planes, with controlled over lap between the portions of light from each LED such that the output beam has an even distribution of light throughout. And, the output beam has relatively sharp cut-offs at its perimeter, all as previously described. In this configuration, the better the light from the LEDs is collimated, the sharper the cut-offs will be.

The embodiment of FIGS. 4H–J does differ from the embodiment of FIGS. 4A–H in that it shows how one light guide 107 can be used to produce one controlled beam from three lights. It also has a different frame 132 than shown in the two light guide 107 version of FIGS. 4A–G. The frame 132 is smaller and can include mounting pegs 133 to assist in mounting light guide 107 to a housing or base. Therefore the embodiment of FIGS. 4H–J illustrates how principles of the invention can be applied to a single beam light. Alternatively, two (or more) separate light guides 107 such as shown in FIGS. 4H–J could be mounted in a base or housing and oriented to create two (or more) controlled beams in pre-designed directions.

It is to be understood that it is preferable that the optical surfaces of any light guide 107 be carefully made. In molding acrylic light guides, which can range in size but in some embodiments can be on the order of an inch or less in dimension for a complete light guide 107 such as shown in FIGS. 4H–J, optical surfaces preferable should be polished (free from machine) to SPI A-2 or better. The part should be gated to mold without sink or bubbles in thick sections. There should not be parting lines in optical surfaces.

The resulting output pattern 110 or 112 would have a relatively precise rectangular pattern having a relatively even distribution (it is preferable that there be no more than +/− 5% to 30% intensity variance across the horizontal pattern). Device 100 efficiently converts LED source conical output distribution into a rectangular output distribution which meets the requirement of a marine bow light.

The generation of such output beams 110 and 112 is accomplished by building the light output in stages. First, surface 1 collects and collimates the otherwise conical output of an LED. Substantial collimation is preferred. In this embodiment the more collimation with guide 107 that is achieved, the sharper the perimeter cut-offs in beams 110 and 112. The amount of cut-off can vary according to the output pattern desired.

In stage two, surface 2 distributes the collimated light generally evenly across the beam but also spreads the beam horizontally.

Finally, surface 3 spreads the beam vertically. This control and manipulation of the conical LED output into a different relatively evenly distributed intensity pattern is done with substantial efficiency.

On the order of 80 to 85% of the LED light energy is maintained in the output of light guide 107. Reasons include the good collection of light from the LED, using angles and total internal reflection surfaces to keep the light energy inside guide 107, and using materials that do not absorb a substantial amount of light. This is why the entire member 107 is referred to as a light guide; it guides most of the light to the output, even though it is manipulating the light and, in this embodiment, it is transparent.

Operation

In operation, the exemplary embodiment would be assembled and manufactured as previously described. Light guide 107 can be separated or molded in one piece. The light sources and other circuitry for light generation can be pre-assembled on circuit board 103 or otherwise assembled into base 104. Cover 108 can be snapped and/or adhesively and/or otherwise installed onto base 104. Light 100 would be mounted into position on the bow of boat 120, keeping the centerline of bow light 100 aligned with the centerline of boat 120. Leads 105 would be appropriately connected to battery 106, and generally be connected to a comprehensive running light control or switch.

When turned on, each set of LEDs 102 would generate its respective colored light, which would be collected and collimated by respective surfaces 1. Collimated light from each LED would be directed into a respective surface 2, which would reflect the light energy in the manner previously described to lens or surface 3. Lens 3, in combination with the size of opening 109, would issue a rectangular pattern of dimensions and even intensity across a cross-section of the beam; blue-green to starboard, and red to port, with the desired angle of transition.

The relatively inexpensive, one-piece plastic light guide 107 accomplishes this light control without expensive optical components or more complex multiple piece construction. The LEDs are long-lasting and robust (especially compared to incandescent lights). Light 100 requires only one or a few LEDs per side.

Other components, base 104 and cover 108, are relatively inexpensive to create. Assembly is also quick and is not labor intensive. The structure of the components can assist in correct alignment. For example, it has been found that correct alignment of the LEDs is important to achieve optimal beam patterns. As shown in FIG. 5, light guide 107 has molded walls 136, 137, 138, and 139, essentially forming part of the frame 132 of member 107, into which a set of LEDs extend. These walls are spaced to ensure the LEDs are correctly aligned relative to each respective surface 1 and deter or disallow any movement adverse to the same.

Options and Alternatives

It is to be understood and appreciated that the foregoing description of the exemplary embodiment is but one form the invention can take and is not exclusive or inclusive. Variations obvious to those skilled in the art are included within the scope of the invention. Some examples are set forth below.

The exemplary embodiment illustrates use of LEDs as light sources. Other sources are possible. Examples are incandescent (e.g. 1–50 watts) or high intensity discharge ("HID"), or fluorescent. Others are possible.

It is to be understood that light 100 could function with just one LED per side, or two per side or three or more per side. In this example, however, two per side of the type disclosed are believed adequate to meet intensity requirements for 1 mile range. Three per side are believed adequate for 2 mile range. Of course, the number needed relate to the required or desired intensity, or to the intensity of the light sources themselves.

Light guide 107 is transparent acrylic. It could be made of other materials. Examples are glass, polycarbonate and polystyrene. Others are possible, as are combinations of materials.

An option would be to create light guide 107 of a colored transparent material to generate light output wavelengths of a desired nature. For example, guide 107 could be colored to modify the hue of the light source for specific applications or requirements. Or, guide 107 could be colored to create a color from a white or daylight light source. Examples of different colors needed for automotive or marine uses are Department of Transportation ("DOT") or ABYC red, green, amber and blue.

As described, the internal surfaces of light guide 107 are configured to be essentially totally internally reflective of the light from sources 102. Alternatively, or in addition, selected surfaces could be reflectively coated.

Alternatives are possible with respect to fabrication of light guide 107 to achieve similar light controlling functions. For example, FIG. 9 illustrates a light guide 107B that might be substituted for light guide 107 previously described. Guide 107B can be a single piece molded acrylic member. It can include a similar collection/collation surface 10 to surface 1 of guide 107. However, it can utilize a second optical surface 11 that is totally internally reflective and is curved in both planes to spread light in both horizontal and vertical directions in the desired ABYC bow light pattern. Surface 11 can be generally described as a generally radiused surface with 5 to 7 degrees of arc. Collimated light passing through surface 10 is essentially turned through about a 90 degree angle toward an exit surface 12. Surface 11 simultaneously spread the light into the required pattern indicated at FIGS. 7 and 8. Like guide 107, the sidewalls of guide 107B direct stray light back into the guide and toward exit surface 12. In this embodiment, exit surface 12 is flat (as opposed to surface 3 of guide 107) and does not substantially alter or spread the light from surface 11, which is distributed and configured into a desired even intensity rectangular pattern by surface 11. This embodiment of guide 107B has the following dimensions and characteristics. The reflective surface 11 is created by sweeping a curved section through a multi-segmented path such that the area of each lens segment determines the light energy at that specific angle. The areas were chosen to generate an even illumination distribution from the source used. The swept curve is chosen to generate a specific vertical distribution. Three dimensional ray tracing was used to correct for aberrations in an iterative process until an even illumination pattern was generated. The segments used are small enough that in practice a continuous curve is generated. Only two shaped optical surfaces (10 and 11) are needed in guide 107B.

As is appreciated by those skilled in the art, by reshaping surface 2 or 11, different intensity distributions and/or light patterns can be generated. For example, changing the shape of surface 2 allows reshaping of the intensity pattern and beam spread along the horizontal axis. Changing the shape of surface 11 can allow reshaping of the intensity pattern and beam spread in the horizontal axis or vertical axis or both.

While the exemplary embodiment has concentrated on a bow light for boats, it will be appreciated that the invention can relate to other lights for boats, lights for automobiles, lights for other vehicles (e.g. aerial or aircraft), or other types and applications for lights whether related or not to vehicles.

Figure 10:
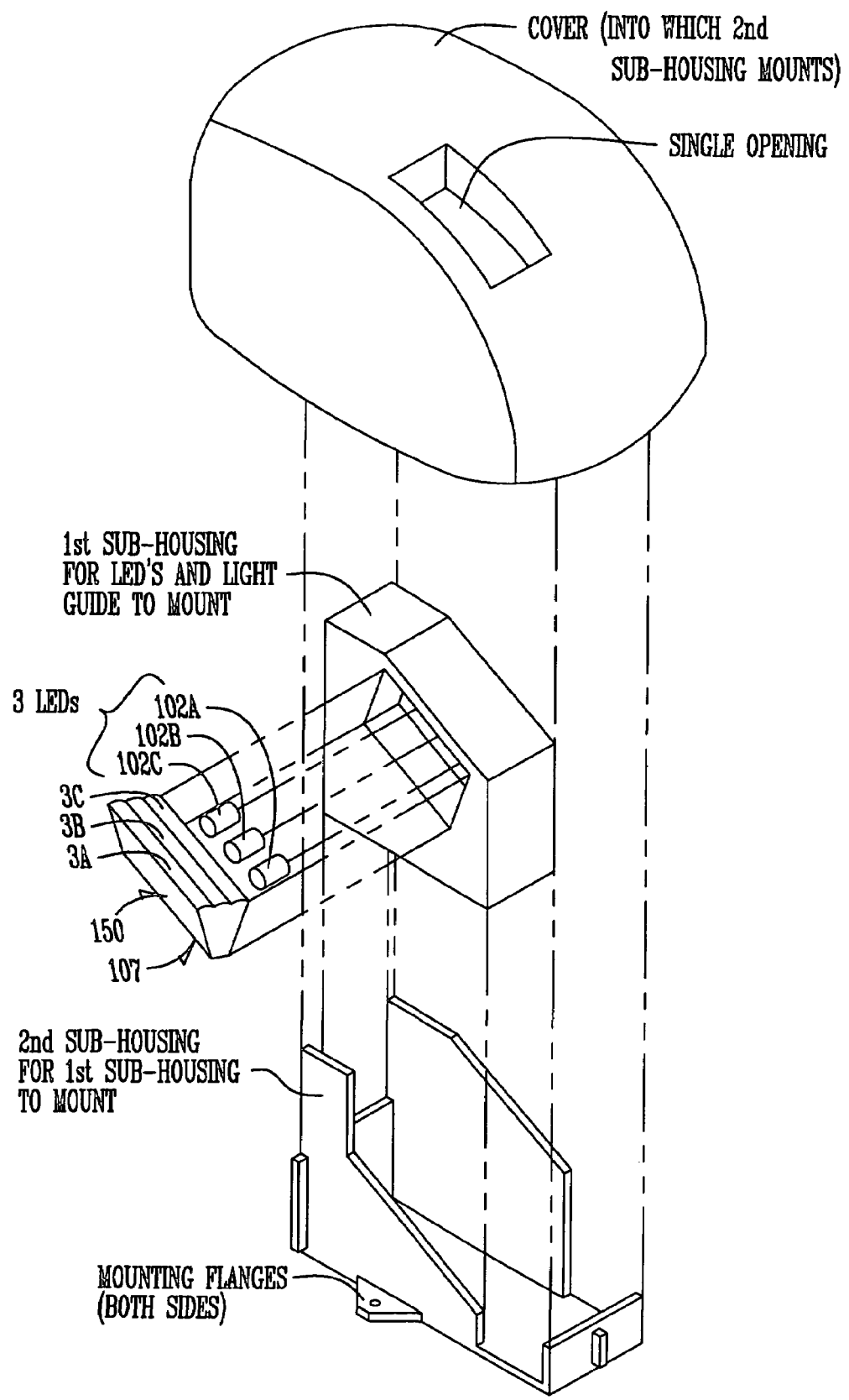
FIG. 10 is an exploded view of an alternative embodiment according to the present invention in the form of a light having a single light pattern output, such as might be used as and automobile, airplane, or other marker light.

FIG. 10 illustrates an alternative exemplary embodiment according to the present invention. It is similar to the embodiments of FIGS. 1–9, but illustrates how a single light pattern can be generated with a set of one or more light sources and a light guide that can be assembled into a housing with an exit opening for the single light pattern. The embodiment of FIG. 10 could be used for a wide variety of applications. One would be a side marker for a vehicle (e.g. land, air, marine), or a marker for a fixed object (e.g. building, monument, buoy, landmark).

It is to be understood that while one of the exemplary embodiments generates beams of different colors by using two separate sets of light sources/light guides, one for the red beam and one for the blue-green beam, it is possible to design surfaces of one light guide such that either two different colored light sources could be directed into different parts of the same light guide, and the kept separate inside the light guide to issue as separate patterns in separate directions from the same light guide, or a single light source (one or plural lights of the same color) could be split into two beams in a single light guide, and filtering medium in the light guide or external of the light guide used to create the desired hue (e.g. red for one beam; blue-green for the other). In either case, this would involve forming external surfaces around the light guide to handle two different beams instead of one. The principles described previously for controlling beam spread in the vertical and horizontal planes can be followed.

What is claimed is:

1. An optical assembly comprising:
    a light guide of a single integral piece of light transmissive material having a plurality of external surfaces comprising:
      (1) a first external entrance surface adapted to collect and substantially collimate light from a light source and direct the substantially collimated light internally into the light guide;
      (2) one or more external surfaces adapted to control direction and vertical and horizontal spread of the substantially collimated light, internally in the light guide with substantially total internal reflection, to create a light pattern approximately rectangular in angle space to issue from the light guide.

2. The optical assembly of claim 1 wherein the light guide is no larger than five inches in length, width and height.

3. The optical assembly of claim 1 wherein the light guide is one piece of material.

4. The optical assembly of claim 3 wherein the material is substantially transparent.

5. The optical assembly of claim 4 wherein the material is plastic.

6. The optical assembly of claim 5 wherein the plastic is one of acrylic, polycarbonate, or polystyrene.

7. The optical assembly of claim 4 wherein the material is glass.

8. The optical assembly of claim 4 wherein at least one surface of the light guide is polished.

9. The optical assembly of claim 4 wherein at least one surface of the light guide includes an optical finish.

10. The optical assembly of claim 1 wherein internal reflectivity is promoted by including a reflective coating on at least one of said surfaces of the light guide adapted to promote internal reflection of light in the light guide.

11. The optical assembly of claim 1 wherein the entrance surface comprises a first external surface of the light guide.

12. The optical assembly of claim 1 wherein said one or more external surfaces comprise a single second surface configured to simultaneously spread the substantially collimated light from the first surface vertically and horizontally.

13. The optical assembly of claim 12 wherein said second surface is curved in two directions.

14. The optical assembly of claim 13 wherein the second surface distributes light substantially evenly.

15. The optical assembly of claim 12 wherein the second surface also changes the direction of the substantially collimated light.

16. The optical assembly of claim 15 wherein the change of direction is on the order of 90 degrees.

17. The optical assembly of claim 12 wherein surfaces of the light guide are substantially at angles to the direction of light in the light guide to promote total internal reflection.

18. The optical assembly of claim 1 wherein said one or more external surfaces comprise a second race configured to spread said substantially collimated light from the first surface a selected angle in a first plane, and a third surface configured to spread light from the second surface a selected angle in a second plane.

19. The optical assembly of claim 18 wherein the second and third surfaces distribute light substantially evenly.

20. The optical assembly of claim 18 wherein the second surface also changes the direction of the substantially collimated light.

21. The optical assembly of claim 20 wherein the change of direction is on the order of 90 degrees.

22. The optical assembly of claim 1 wherein a surface of the light guide is configured to split light into two directions within the light guide, light in each of the directions controlled according to claim 1, step 1(a)(iii).

23. The optical assembly of claim 22 wherein a filtering medium is included in the path of the light in at least one of the directions to control the hue of the light.

24. The optical assembly of claim 23 wherein the filtering medium creates the same hue for both directions of light.

25. The optical assembly of claim 23 wherein the filtering medium creates a different hue for each direction of light.

26. The optical assembly of claim 1 further in combination with a light source.

27. The apparatus of claim 26 wherein the light source comprises an LED.

28. The apparatus of claim 26 wherein the light source comprises an incandescent source.

29. The apparatus of claim 26 wherein the light source comprises a fluorescent source.

30. The apparatus of claim 26 wherein the light source comprises an HID source.

31. The apparatus of claim 26 wherein the light source generates light of a selected hue.

32. The apparatus of claim 26 wherein the light source is filtered to create a selected hue of light.

33. The apparatus of claim 26 wherein the light source is a single light generating a single light pattern.

34. The apparatus of claim 26 wherein the light source comprises a plurality of lights, each generating a light pattern.

35. The apparatus of claim 34 wherein the light guide has said one or more surfaces for each of said plurality of lights.

36. The apparatus of claim 26 further in combination with a housing.

37. The apparatus of claim 36 wherein the housing includes a mount for the light guide and a mount for the light source, the mounts adapted to automatically align the light source relative to the light guide when the apparatus is assembled.

38. The apparatus of claim 36 further comprising a circuit adapted to be mounted in the housing and to communicate electrical power to the light source.

39. The apparatus of claim 36 wherein the housing includes a mounting portion adapted for mounting the housing to an object.

40. The apparatus of claim 39 wherein the mounting portion is adapted to mount on the external surface of a vehicle.

41. The apparatus of claim 40 wherein the vehicle is an automobile, marine vehicle or aircraft.

42. The apparatus of claim 39 wherein the object is a fixed object.

43. The apparatus of claim 39 wherein the apparatus is marine-grade and water-proofed.

44. The apparatus of claim 39 wherein the housing includes apertures substantially aligned with the light pattern exiting the light guide.

45. The apparatus of claim 39 comprising first and second sets of light sources and light guides, each set generating a rectangular beam pattern of a different color in angularly offset directions generally in the same plane.

46. The apparatus of claim 45 wherein the different colors are red and blue-green such as used for bow lights for marine vessels.

47. A method of controlling light from a light source comprising:
(a) directing light from the light source into a single integral piece of light transmissive material having a plurality of external surfaces;
(b) one of said external surfaces collecting and substantially collimating light from the light source and directing the substantially collimated light internally into the single integral piece of light transmissive material;
(c) controlling horizontal and vertical spread of the light source with one or more of said external surfaces of the material, internally in the material with substantially total internal reflection, to create a light pattern approximately rectangular in angle space projecting from the material.

48. The method of claim 47 wherein the material is no larger than five inches in length, width and height.

49. The method of claim 47 wherein internal reflectivity is promoted by one or more of (a) including a reflective coating on at least one of said surfaces of the material and (b) directing light at angles to the surfaces of the material.

50. The method of claim 47 wherein said plurality of external surfaces comprise a second surface configured to simultaneously spread substantially collimated light from a first surface vertically and horizontally.

51. The method of claim 47 wherein one or more other said external surfaces controls horizontal and vertical spread and the direction of the substantially collimated light.

52. The method of claim 51 wherein one of said one or more other said external surfaces is configured to spread said substantially collimated light from the first surface a selected angle in a first plane, and another of said one or more other of said external surfaces is configured to spread light from the second surface a selected angle in a second plane.

53. The method of claim 47 wherein a said external surface of the material is configured to split light into two directions within the material, light in each of the directions controlled according to claim 50, step (b).

54. The method of claim 53 wherein a filtering medium is included in the path of the light in at least one of the directions to control the hue of the light.

55. The method of claim 54 wherein the filtering medium creates the same hue for both directions of light.

56. The method of claim 54 wherein the filtering medium creates a different hue for each direction of light.

57. The method of claim 47 wherein the light source comprises an LED.

58. The method of claim 47 wherein the light source is a single light generating a single light pattern, resulting in a single rectangular pattern from the material.

59. The method of claim 47 wherein the light source comprises a plurality of lights, each generating a light pattern, but resulting in a single substantially rectangular pattern from the material.

60. The method of claim 47 wherein the light source comprises a plurality of lights, the plurality of lights comprising first anti second sets of lights, each set generating a light pattern, but resulting in first and second substantially rectangular patterns issuing from the material in different directions.

61. The method of claim 47 further comprising a second light source and second single integral piece of light transmissive material having a plurality of external surfaces adapted to control horizontal and vertical spread of the second light source with one or more of said external surfaces of the second piece of material, internally in the material with substantially total internal reflection, to create a second light pattern substantially rectangular in angle space at or from the second piece of material.

62. The method of claim 61 further comprising combining the first and second sets of light sources and pieces of material in a housing in a manner that the first and second substantially rectangular light patterns issue from the housing in predesigned vertical and horizontal beam spreads and at predesigned angles relative to one another.

63. The method of claim 62 further comprising a separation of the first and second substantially rectangular light patterns at the housing.

64. The method of claim 63 wherein the first light source is a first color and the second light source is a second color.

65. The method of claim 64 wherein the first color is red and the second color is blue-green and the housing is adapted for mounting on a marine craft.

66. A bow light for a marine vessel comprising:
(a) a housing adapted for mounting on a bow of a marine vessel;
(b) first and second tight sources mountable in the base;
(c) first and second light guides, each of a single integral piece of light transmissive material and mountable in the base in optical alignment with a corresponding light source and each having a plurality of external surfaces comprising:
(i) a first external surface adapted to collect and substantially collimate light from a light source and direct the substantially collimated light internally into its respective light guide;
(ii) one or more external surfaces adapted to control direction and vertical and horizontal spread of the substantially collimated light, internally in the light guide with substantially total internal reflection, to create a light pattern approximately rectangular in angle space to issue from each respective light guide;

(d) the first and second light guides mounted such that the light pattern from each light guide is angularly offset generally in horizontal plane, when the bow light is installed on a marine vessel; and (e) one light pattern having a red hue, the other having a blue-green hue.

* * * * *

UNITED STATES PATENT AND TRADEMARK OFFICE
CERTIFICATE OF CORRECTION

| | | |
|---|---|---|
| PATENT NO. | : 7,055,995 B1 | Page 1 of 1 |
| APPLICATION NO. | : 10/357796 | |
| DATED | : June 6, 2006 | |
| INVENTOR(S) | : Condon, Patrick J. and Mark B. Pruss | |

It is certified that error appears in the above-identified patent and that said Letters Patent is hereby corrected as shown below:

Claim 66, Column 14, line 55:
(b) first and second "tight" --light-- sources mountable in the base;

Signed and Sealed this

Fifteenth Day of August, 2006

JON W. DUDAS
*Director of the United States Patent and Trademark Office*